United States Patent
Ebsen et al.

(10) Patent No.: US 10,558,380 B2
(45) Date of Patent: Feb. 11, 2020

(54) ACTIVE POWER MANAGEMENT

(71) Applicant: SEAGATE TECHNOLOGY LLC, Cupertino, CA (US)

(72) Inventors: David S. Ebsen, Minnetonka, MN (US); Kevin A. Gomez, Eden Prairie, MN (US); Mark Ish, Castro Valley, CA (US); Daniel J. Benjamin, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/232,682

(22) Filed: Aug. 9, 2016

(65) Prior Publication Data
US 2018/0046408 A1  Feb. 15, 2018

(51) Int. Cl.
*G06F 3/06* (2006.01)

(52) U.S. Cl.
CPC .......... *G06F 3/0634* (2013.01); *G06F 3/0625* (2013.01)

(58) Field of Classification Search
CPC ........ G06F 3/0659; G06F 3/0625; G06F 1/32; G06F 1/3203; G06F 1/3206; G06F 1/3215; G06F 1/3221; G06F 1/3225; G06F 1/3234; G06F 1/325; G06F 1/3268; G06F 1/3275; G06F 1/3287
See application file for complete search history.

(56) References Cited

U.S. PATENT DOCUMENTS

| | | | | |
|---|---|---|---|---|
| 9,401,184 B1* | 7/2016 | Erez | ......................... | G11C 5/14 |
| 10,156,987 B1* | 12/2018 | Gutierrez | ............ | G06F 11/3058 |
| 2007/0027580 A1* | 2/2007 | Ligtenberg | ............. | G05D 23/19 |
| | | | | 700/300 |
| 2007/0211551 A1* | 9/2007 | Yogev | ....................... | G11C 5/14 |
| | | | | 365/226 |
| 2010/0264983 A1* | 10/2010 | Nation | ..................... | G06F 1/206 |
| | | | | 327/540 |
| 2011/0122691 A1* | 5/2011 | Sprouse | .................... | G06F 1/28 |
| | | | | 365/185.03 |
| 2012/0023351 A1* | 1/2012 | Wakrat | .................. | G06F 1/3203 |
| | | | | 713/322 |
| 2013/0097433 A1 | 4/2013 | Boorman et al. | | |

(Continued)

OTHER PUBLICATIONS

Skadron, K. et al., "Temperature-Aware Microarchitecture," Proc. Int. Symp. Computer Architecture, Jun. 2003, pp. 2-13.

(Continued)

*Primary Examiner* — Edward J Dudek, Jr.
*Assistant Examiner* — Andrew Russell
(74) *Attorney, Agent, or Firm* — Hall Estill Attorneys at Law

(57) ABSTRACT

Systems and methods for active power management are described. In one embodiment, the systems and methods include obtaining power dissipation metrics for a plurality of components under one or more operating scenarios, generating a reference dissipation model based on the power dissipation metrics of the plurality of components, and implementing the reference dissipation model in a storage system to make component scheduling decisions in relation to power management of the storage system. In some embodiments, the storage system includes any combination of a hard disk drive, a solid state drive, a hybrid drive, and a system of multiple storage drives.

20 Claims, 7 Drawing Sheets

(56) References Cited

U.S. PATENT DOCUMENTS

| | | | |
|---|---|---|---|
| 2013/0138901 A1* | 5/2013 | Cordero | G06F 11/1658 711/162 |
| 2014/0101371 A1* | 4/2014 | Nguyen | G06F 3/0616 711/103 |
| 2014/0181503 A1* | 6/2014 | Bettink | G06F 9/44 713/100 |
| 2015/0169021 A1 | 6/2015 | Salessi et al. | |
| 2015/0185799 A1* | 7/2015 | Robles | G06F 1/32 713/320 |
| 2015/0185813 A1* | 7/2015 | Ping | G06F 3/06 713/323 |
| 2015/0220278 A1 | 8/2015 | Sarcone et al. | |
| 2016/0320995 A1* | 11/2016 | Warriner | G06F 3/0625 |
| 2016/0378149 A1* | 12/2016 | Kam | G06F 1/206 713/320 |
| 2017/0249091 A1* | 8/2017 | Hodes | G06F 3/0611 |

OTHER PUBLICATIONS

Velusamy, S. et al., "Adaptive Cache Decay Using Formal Feedback Control," In Proceedings of the 2002 Workshop on Memory Performance Issues, May 2002.

Skadron, K. et al., "Control-Theoretic Techniques and Thermal-RC Modeling for Accurate and Localized Dynamic Thermal Management," High-Performance Computer Architecture, 2002. Proceedings. Eighth International Symposium on IEEE, 2002.

Huang, W. et al., "Compact Thermal Modeling for Temperature-Aware Design," Proceedings of the 41st annual Design Automation Conference, ACM, 2004.

\* cited by examiner

ACTIVE POWER MANAGEMENT

SUMMARY

The present disclosure is directed to methods and systems for active power management. In some embodiments, the present systems and methods may provide dynamically updated power management to improve system performance.

A storage system for active power management is described. In one embodiment, the storage system may include a storage controller to obtain power dissipation metrics for a plurality of components under one or more operating scenarios, generate a reference dissipation model based on the power dissipation metrics of the plurality of components, and implement the reference dissipation model in a storage system to make component scheduling decisions in relation to power management of the storage system.

In some embodiments, the plurality of components may include at least one of a flash memory die, a storage controller, a storage processor, a storage buffer, a servo motor, a spindle, and a read/write head. In some cases, the storage system may include any combination of a hard disk drive, a solid state drive, a hybrid drive, and a system of multiple storage drives.

In some embodiments, the storage controller may be configured to receive power dissipation feedback from a current sensor on the storage system in relation to a first component of the storage system. In some cases, the first component may be associated with at least one of the plurality of components.

In some embodiments, the storage controller may be configured to identify, based on the received power dissipation feedback, a variation from an expected power dissipation of the first component of the storage system in relation to the reference dissipation model. In some embodiments, the storage controller may be configured to adjust the reference dissipation model on the storage system in relation to the identified variation of the first component.

In some embodiments, the storage controller may be configured to receive a request to perform an operation on the storage system. In some cases, the operation may include at least one of a read operation, a write operation, and an erase operation. In some embodiments, the storage controller may be configured to identify a predetermined default number of components used to perform the requested operation.

In some embodiments, the storage controller may be configured to determine, based on the reference dissipation model, a maximum number of components to use to perform the requested operation while keeping the storage system operating within guidelines of a power budget imposed on the storage system. In some embodiments, the storage controller may be configured to schedule the maximum number of components of the storage system to perform the requested operation. In some cases, the maximum number of components may exceed the default number of components used for the operation.

In some embodiments, determining the maximum number of components may include a determination that an amount of heat generated by the maximum number of components performing the requested operation does not exceed a thermal budget imposed on the storage system.

An apparatus for active power management is also described. In one embodiment, the apparatus may include a storage drive and a controller to perform the steps of obtaining power dissipation metrics for a plurality of components under one or more operating scenarios, generating a reference dissipation model based on the power dissipation metrics of the plurality of components, and implementing the reference dissipation model in a storage system to make component scheduling decisions in relation to power management of the storage system. In some cases, the storage system may include any combination of a hard disk drive, a solid state drive, a hybrid drive, and a system of multiple storage drives.

A method for active power management is also described. In one embodiment, the method may include obtaining power dissipation metrics for a plurality of components under one or more operating scenarios, generating a reference dissipation model based on the power dissipation metrics of the plurality of components, and implementing the reference dissipation model in a storage system to make component scheduling decisions in relation to power management of the storage system. In some cases, the storage system may include any combination of a hard disk drive, a solid state drive, a hybrid drive, and a system of multiple storage drives.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to active power management. In some embodiments, power management may be based on activating a preset number of components on a system such as a storage drive. For example, power management may stipulate how many flash memory dies may be activated for a given operation. In some cases, power management may be reactive to current measurements of one or more sensors.

In one embodiment, the present systems and methods may use an internal adaptive reference power model of a storage drive, thereby closing the loop on current measurement. Implementing an adaptive reference power model may enable more accurate and predictive power monitoring and control, resulting in performance that more closely approaches the limits of a power budget for the storage drive.

In one embodiment, the reference model has parameters for power dissipation for all major power consumers in a storage drive such as flash memory dies, storage controllers, processors, memory, spindle motors, magnetic read/write heads, etc. In some embodiments, a calibration procedure may test various components in a model storage drive to establish initial values. A reference model may be generated based on the calibration procedure. In some cases, the calibration procedure may detect drive-to-drive and/or component variations using a drive-level current sensor for feedback. Accordingly, parameters of the reference model adapt to correct for any errors in between predicted power and measured power.

In some embodiments, the generated reference model may be implemented on a storage drive to make scheduling decisions using predicted power as a limit to the number of components to activate instead of measured power. Thus, in one embodiment, the systems and methods may include obtaining power dissipation metrics for a plurality of components of a test storage system under one or more operating scenarios, referencing the type of components used, number of components activated, a period of time each component is activated, and the like. In some cases, the systems and methods may include generating a reference power model based on the power dissipation metrics of the plurality of components and implementing the reference power model in a storage system. The storage system may include any combination of a hard disk drive, a solid state drive, a hybrid drive, and a system of multiple storage drives.

Figure 1:
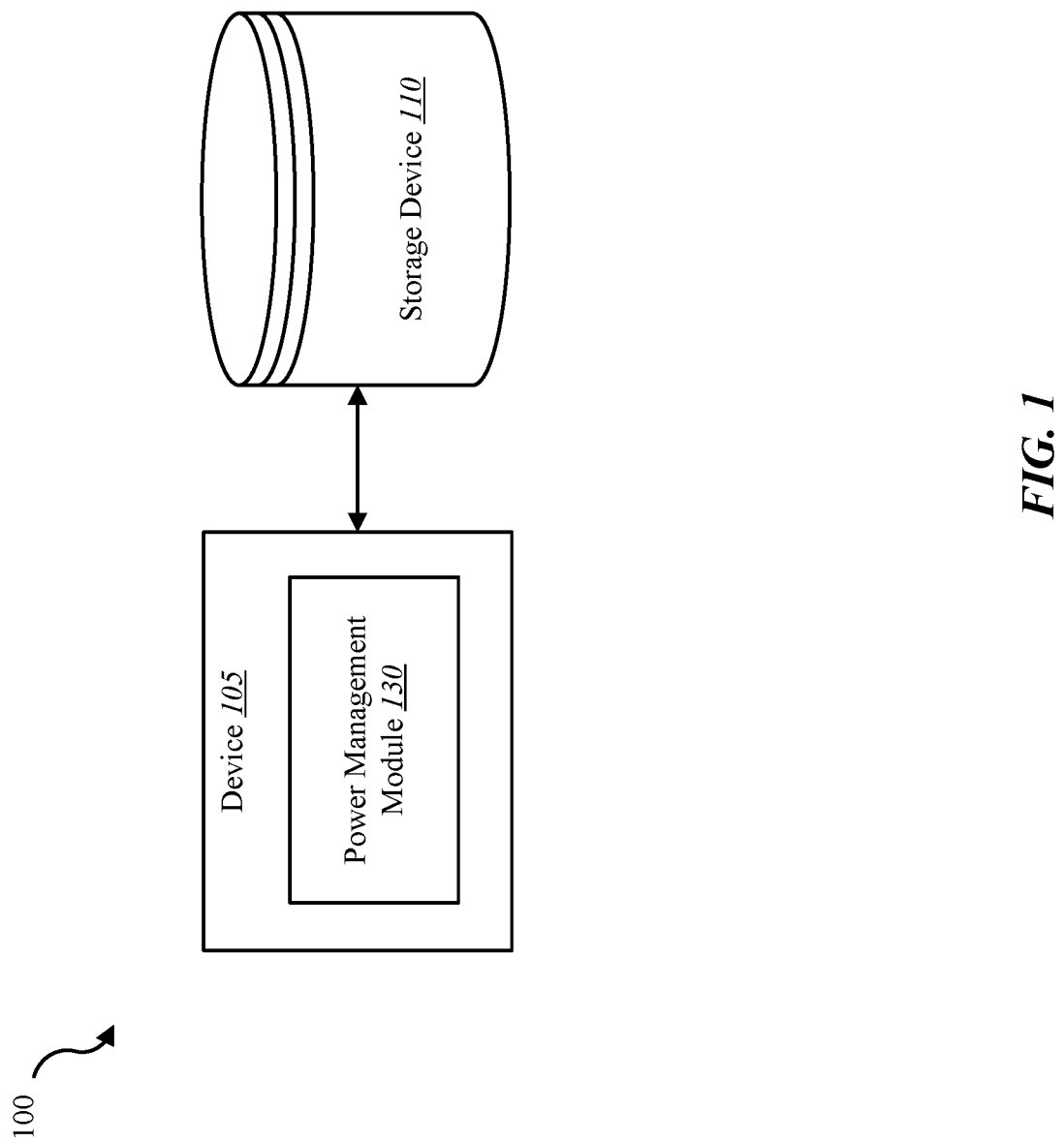
FIG. 1 is a block diagram of an example of a system in accordance with various embodiments.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device (e.g., device 105). In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, etc. In some configurations, device 105 may include a power management module 130. In one example, the device 105 may be coupled to storage device 110. In some embodiments, device 105 and storage device 110 may be components of flash memory or solid state drive. Alternatively, device 105 may be a component of a host (e.g., operating system, host hardware system, etc.) of the storage device 110.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Power management module 130 may generate a reference power model in relation to a power budget for a storage system. Power management module 130 may schedule activation of components in the storage system based on the reference power model.

Figure 2:
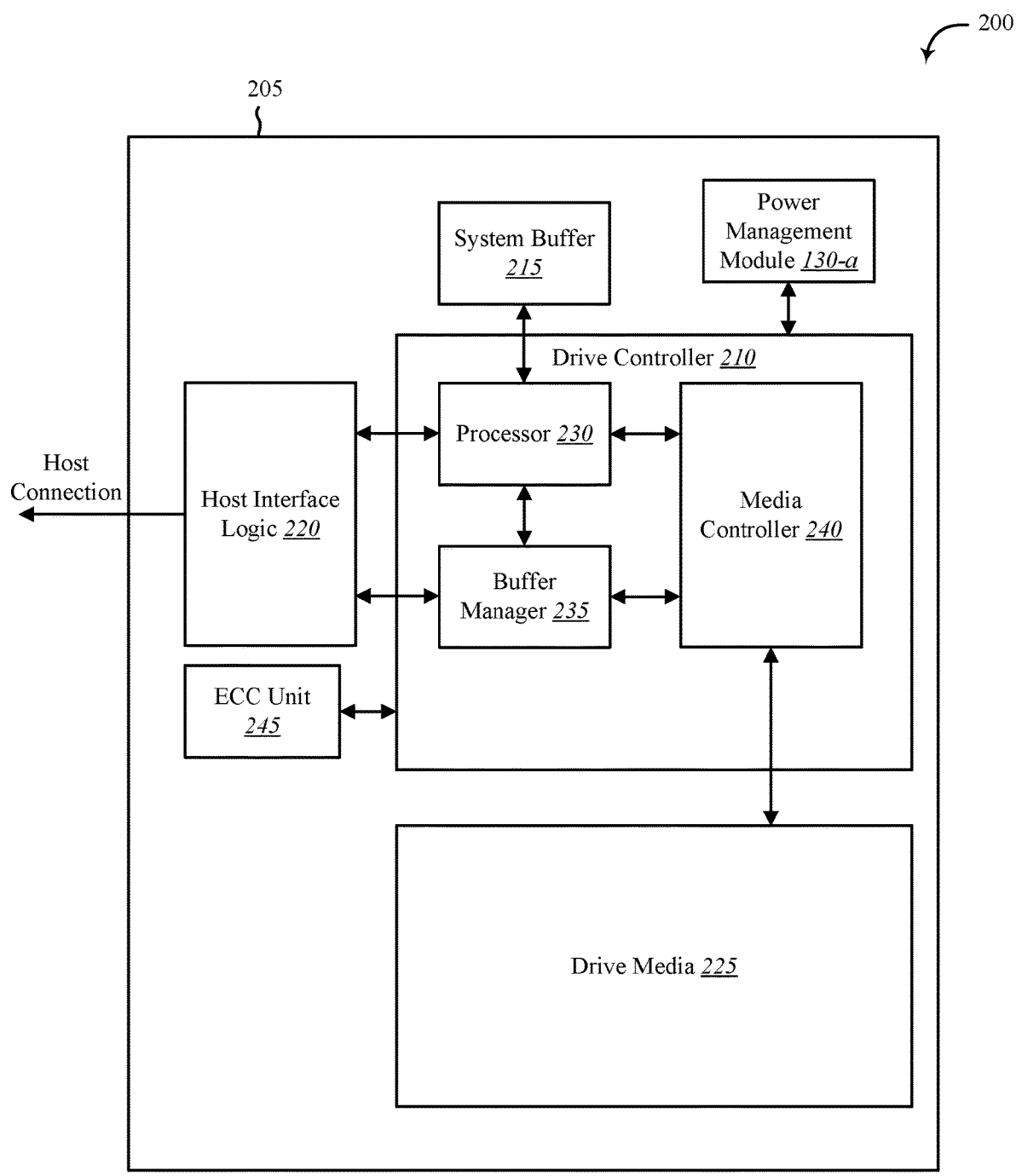
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, and power management module 130-a. Each of these components may be in communication with each other and/or other components directly and/or indirectly.

One or more of the components of the apparatus 205, individually or collectively, may be implemented using one or more application-specific integrated circuits (ASICs)

adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). The drive buffer 215 may hold data temporarily for internal operations of apparatus 205. For example, a host may send data to apparatus 205 with a request to store the data on the drive media 225. The drive controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

Although depicted outside of drive controller 210, in some embodiments, power management module 130-a may include software, firmware, and/or hardware located within drive controller 210. For example, power management module 130-a may include at least a portions of processor 230, buffer manager 235, and/or media controller 240. In one example, power management module 130-a may include one or more instructions executed by processor 230, buffer manager 235, and/or media controller 240. In some embodiments, power management module 130-a may be configured to monitor levels of power and/or heat dissipation in relation to activating components of the apparatus 205 such as drive controller 210, drive buffer 215, host interface logic 220, drive media 225, ECC unit 245, and so forth. In some embodiments, power management module 130-a may generate a reference power model based on the monitored power and/or heat dissipation. The reference power model may stipulate which components and how many components of apparatus 205 to activate for a given operation. In some embodiments, power management module 130-a may implement the reference power model and activate components of apparatus 205 based on values in the reference power model.

Figure 3:
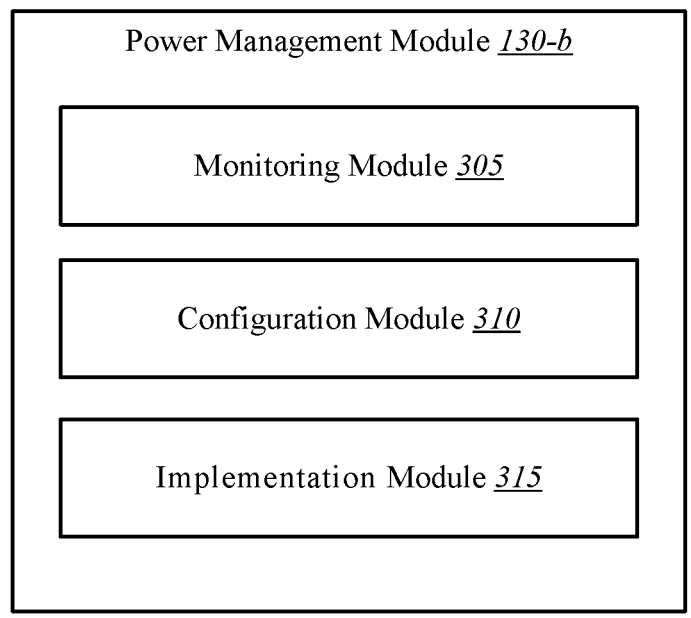
FIG. 3 shows a block diagram of one or more modules in accordance with various aspects of this disclosure.

FIG. 3 shows a block diagram 300 of a power management module 130-b. The power management module 130-b may include one or more processors, memory, and/or one or more storage devices. The power management module 130-b may include monitoring module 305, configuration module 310, and implementation module 315. The power management module 130-b may be one example of power management module 130 of FIGS. 1 and/or 2. Each of these components may be in communication with each other.

In one embodiment, monitoring module 305 may be configured to obtain power dissipation metrics for one or more components of a storage system under one or more operating scenarios. In some embodiments, the monitoring module 305 may collect heat dissipation metrics for the storage system under the one or more operating scenarios. Thus, any reference to a reference dissipation model may refer to a power dissipation profile and/or a heat dissipation profile.

As one example, monitoring module 305 may obtain power and/or heat dissipation metrics for a processor, memory, storage controller, media controller, buffer, flash memory die, a servo motor, a spindle, and a read/write head, and the like. In some cases, monitoring module 305 may obtain power dissipation metrics for any combination of read operations, write operations, erase operations, scan operations, garbage collection operations, and the like. The storage system may include any combination of a hard disk drive, a solid state drive, a hybrid drive with both a hard disk and solid state flash memory, a storage server, and a system of multiple storage drives such as a storage enclosure and the like.

In some embodiments, configuration module 310 may generate a reference dissipation model based on the power and/or heat dissipation metrics of one or more components of a storage system. The reference dissipation model may include the amount of power and/or heat each component of the storage system dissipates under each given operating scenario. As one example, the reference dissipation model may include the amount of power and/or heat dissipated by a flash memory die during a read operation, and so forth.

In some embodiments, implementation module 315 may be configured to implement the reference dissipation model in the storage system to make component scheduling decisions in relation to power management of the storage system. For example, upon receiving data to be written to the storage system, implementation module 315 may schedule a write operation to write the received data to the storage system in accordance with the reference dissipation model. As one example, implementation module 315 may determine, based on the amount of received data, that one flash memory die may be activated in accordance with the reference dissipation model. Accordingly, the implementation module 315 may use one flash memory die to write the received data to the storage system.

In some embodiments, implementation module 315 may determine that the received data has a high priority. Accordingly, implementation module 315 may activate more than one flash memory die to write the received data to the storage system based on the data's high priority. In some embodiments, implementation module 315 may exceed a default number of active components for a given operation based on a performance setting. For example, implementation module 315 may exceed the reference dissipation model when the storage system is configured in a high performance mode. For instance, the implementation module 315 may activate more components than stipulated by the reference dissipation model to perform an operation when the storage system is in a high performance mode.

In some embodiments, implementation module 315 may activate components for a given operation based on a predetermined maximum power and/or heat dissipation level. For example, implementation module 315 may select a number of components to activate based on the reference dissipation model indicating that the selected number of components being activated will not exceed the predetermined maximum power and/or heat dissipation level. In some embodiments, the implementation module 315 may follow the default number of components stipulated in the reference dissipation model when the storage system is configured in a default performance mode. Likewise, implementation module 315 may reduce the number of components to be activated for a given operation based on the storage system being configured in a power saving mode. In some embodiments, implementation module 315 may be configured to implement a maximum number of components in any storage system mode so long as the number of activated components do not exceed the predetermined maximum power and/or heat dissipation level.

In some embodiments, monitoring module 305 may be configured to receive power dissipation feedback from a current sensor on the storage system in relation to a component of the storage system. In some embodiments, monitoring module 305 may be configured to identify, based on the received power dissipation feedback, a variation from an expected power dissipation of the component of the storage system in relation to the reference dissipation model. In some embodiments, implementation module 315 may be configured to adjust the reference dissipation model in relation to the identified variation of the component. For example, a reference dissipation model may be configured based on a model storage system. When the reference dissipation model is implemented in another storage system based on the model storage system, variations in power and/or heat dissipation may result from component variations. Component variations may occur due to environmental variations in which the storage system operates (e.g., air-conditioned environment, non-air-conditioned environment, climate variations in area of operation, etc.). In some cases, component variations may occur due to part supplier variations, variations in component and/or device manufacturing methods (e.g., manufacturing process variations in components and/or device, differences in types of material used in components and/or device, differences in quantity and/or quality of materials used in manufacturing of components and/or device, etc.), and the like. Accordingly, implementation module 315 may adjust the reference dissipation model according to the dissipations metrics of a given storage system.

In one embodiment, monitoring module 305 may be configured to receive a request to perform an operation on the storage system, the operation comprising at least one of a read operation, a write operation, an erase operation, and the like. In some embodiments, configuration module 310 may determine, in accordance with the reference dissipation model a default number of components to use for a given operation. In some embodiments, configuration module 310 may identify a predetermined default number of components used to perform a requested operation.

In some embodiments, configuration module 310 may determine, based on the reference dissipation model, a maximum number of components to use to perform the requested operation while keeping the storage system operating within guidelines of a power budget imposed on the storage system. For example, configuration module 310 may determine a default number of components as well as a maximum number of components to use to perform a given operation, the maximum number of components being different than the default number of components. In some cases, determining the maximum number of components may include a determination that an amount of heat generated by the maximum number of components performing the requested operation does not exceed a thermal budget imposed on the storage system.

In some embodiments, configuration module 310 may schedule the maximum number of components of the storage system to perform the requested operation. In some cases, the maximum number of components exceeds a default number of components used for the operation, in accordance with the reference dissipation model. In some embodiments, implementation module 315 may be configured to perform the requested operation using the maximum number of components scheduled by the configuration module 310.

Figure 4:
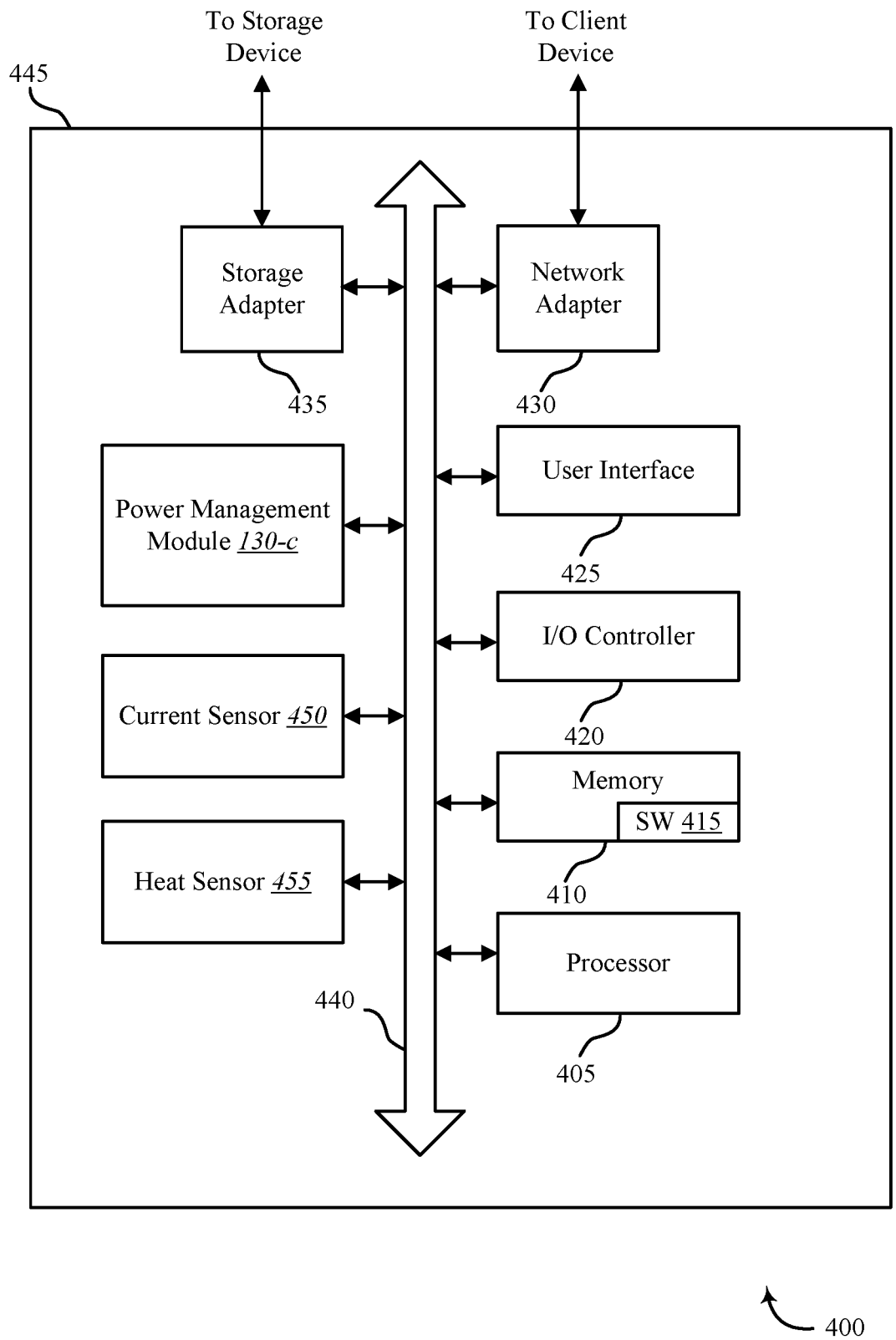
FIG. 4 shows a diagram of a system in accordance with various aspects of this disclosure.

FIG. 4 shows a system 400 for active power management, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, a storage adapter 435, current sensor 450, and heat sensor 455. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a power management module 130-c, which may perform the functions described above for the power management module 130 of FIGS. 1, 2 and/or 3.

In one embodiment, current sensor 450 may be used by apparatus 445 to measure current usage in relation to one or more components of apparatus 445. Similarly, in one embodiment, heat sensor 455 may be used by apparatus 445 to measure temperature in relation to one or more components of apparatus 445. For example, in some embodiments, apparatus 445 may be configured to receive power dissipation feedback from current sensor 450 and/or heat dissipation feedback from heat sensor 455 in relation to a component such as processor module 405. In some embodiments, apparatus 445 may identify, based on the received power and/or heat dissipation feedback, a variation from an expected dissipation of the processor module 405 specified in the reference dissipation model. In some embodiments, apparatus 445 may adjust the reference dissipation model in relation to the identified variation of the component.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the power management module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices over a network. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
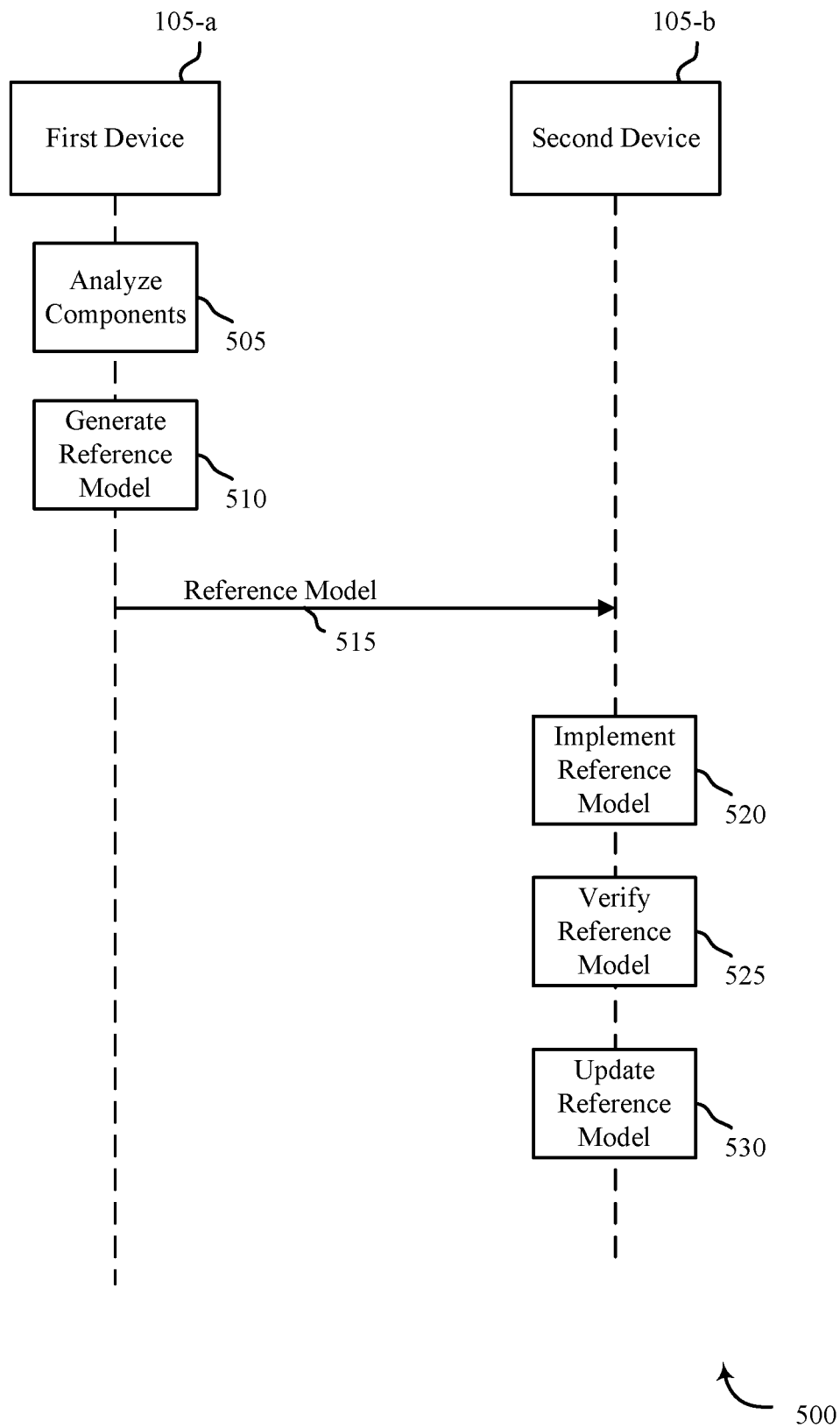
FIG. 5 shows one embodiment of an environment in accordance with various aspects of this disclosure.

FIG. 5 shows an environment 500 for active power management, in accordance with various examples. At least one aspect of environment 500 may be implemented in conjunction with device 105 of FIG. 1, apparatus 205 of FIG. 2, and/or power management module 130 depicted in FIGS. 1, 2, 3, and/or 4.

As depicted, environment 500 may include first device 105-a and second device 105-b. In one embodiment, first and second devices 105 of FIG. 5 may be examples of device 105 of FIG. 1.

As depicted, at step 505, first device 105-a may analyze one or more components of first device 105-a. For example, first device 105-a may analyze electrical and/or mechanical components of first device 105-a. In one embodiment, first device 105-a may analyze its components to determine an amount of power and/or heat dissipation associated with the components. Based on this analysis, at step 510, first device 105-a may generate a reference model. The reference model generated by first device 105-a may include a reference model of power and/or heat dissipation when one or more components are activated for a given operation such as a read operation, write operation, erase operation, etc.

In one embodiment, at step 515, first device 105-a may provide its reference model to second device 105-b. In some embodiments, at step 520, second device 105-b may implement the reference model provided by first device 105-a. As depicted, at step 525, second device 105-b may verify the provided reference model. For example, second device 105-b may analyze one or more components of second device 105-b and compare this analysis to the reference model. In some embodiments, at step 530, second device 105-b may update the reference model based on this comparison. For example, second device 105-b may determine that a processor uses more or less current than specified by the provided reference model. Accordingly, second device 105-b may update the reference model and implement the updated reference model to schedule activation of components in second device 105-b based on a request to perform a given operation.

Figure 6:
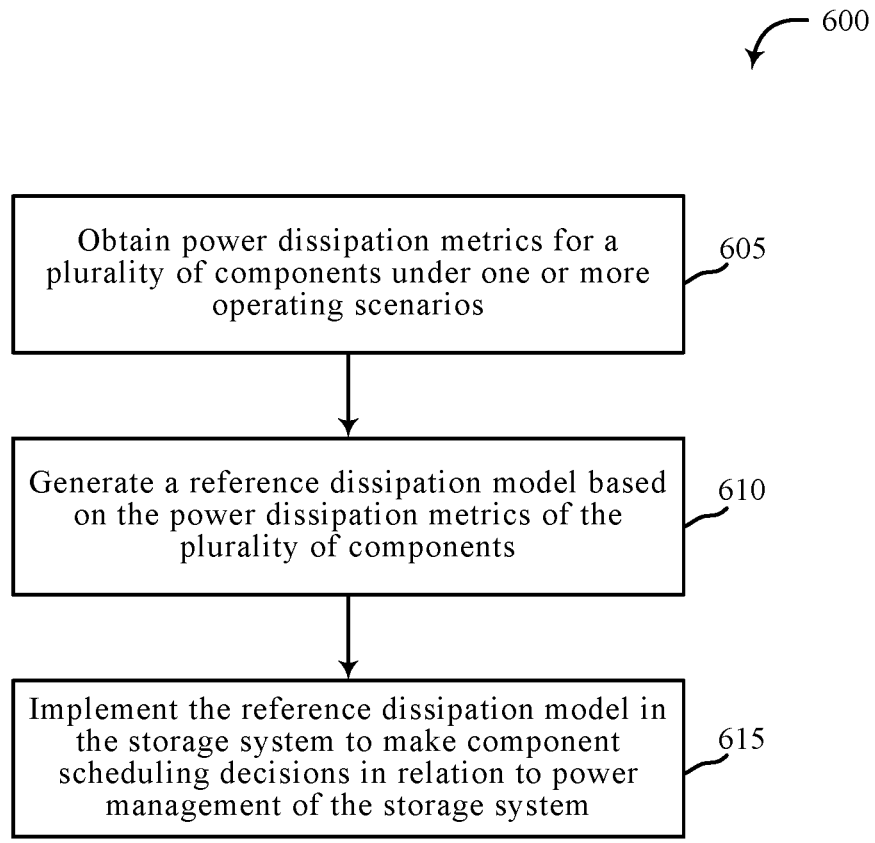
FIG. 6 is a flow chart illustrating an example of a method in accordance with various aspects of this disclosure.

FIG. 6 is a flow chart illustrating an example of a method 600 for active power management, in accordance with various aspects of the present disclosure. One or more aspects of the method 600 may be implemented in conjunction with device 105 of FIG. 1, apparatus 205 of FIG. 2, and/or power management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include obtaining power dissipation metrics for a plurality of components under one or more operating scenarios. At block 610, the method 600 may include generating a reference dissipation model based on the power dissipation metrics of the plurality of components. At block 615, the method 600 may include implementing the reference dissipation model in the storage system to make component scheduling decisions in relation to power management of the storage system.

The operation(s) at block 605-615 may be performed using the power management module 130 described with reference to FIGS. 1-4 and/or another module. Thus, the method 600 may provide for active power management relating to active power management. It should be noted that the method 600 is just one implementation and that the operations of the method 600 may be rearranged, omitted, and/or otherwise modified such that other implementations are possible and contemplated.

Figure 7:
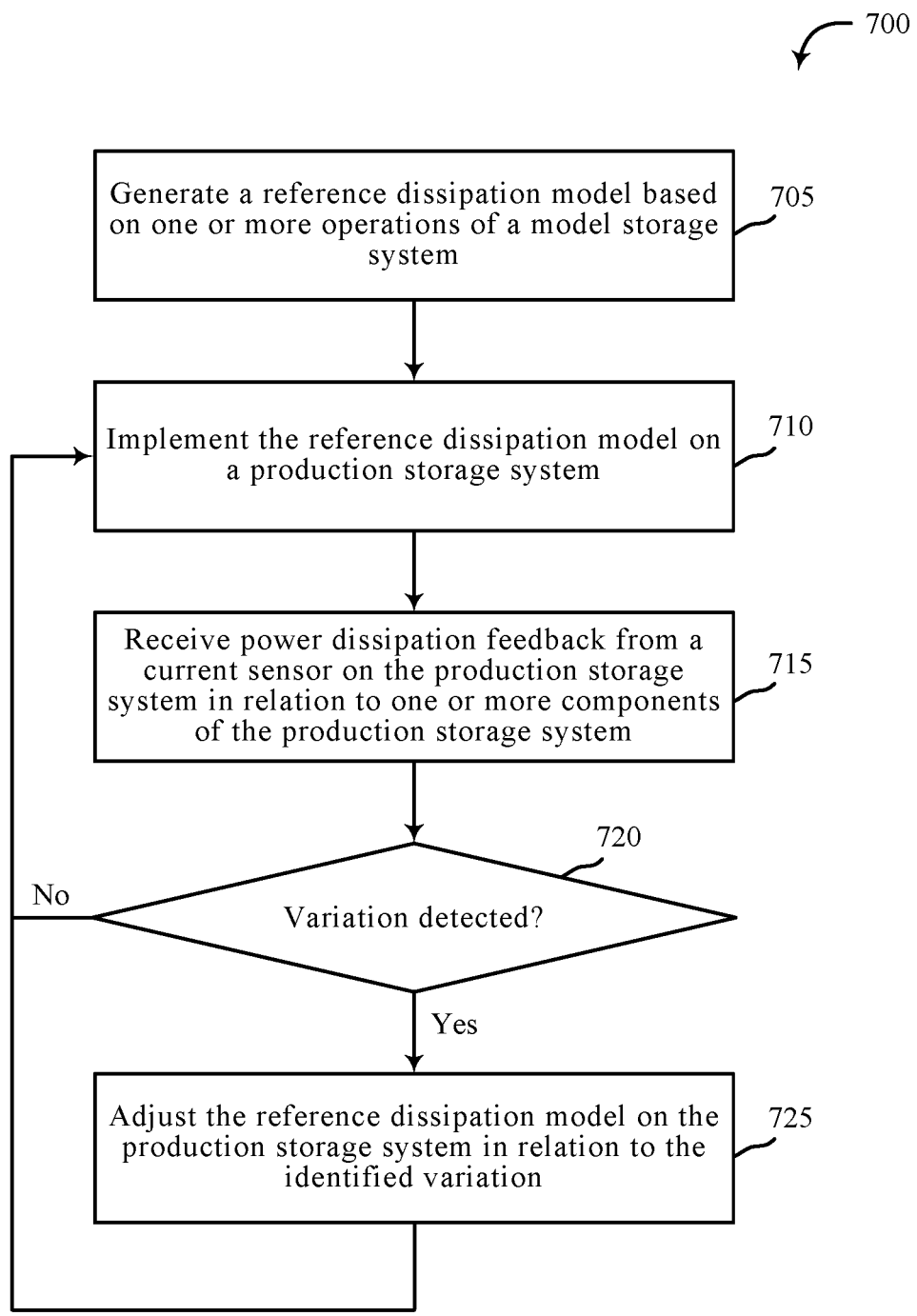
FIG. 7 is a flow chart illustrating an example of a method in accordance with various aspects of this disclosure.

FIG. 7 is a flow chart illustrating an example of a method 700 for active power management, in accordance with various aspects of the present disclosure. One or more aspects of the method 700 may be implemented in conjunction with device 105 of FIG. 1, apparatus 205 of FIG. 2, and/or power management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include generating a reference dissipation model based on one or more operations of a model storage system. At block 710, the method 700 may include implementing the reference dissipation model on a production storage system. At block 715, the method 700 may include receiving power dissipation feedback from a current sensor on the production storage system. In some cases, the power dissipation feedback may be received in relation to one or more components of the production storage system. In some embodiments, the power dissipation feedback may include feedback from a current sensor and/or a heat sensor. At block 720, the method 700 may include determining whether a variation between the reference dissipation model and the actual operation of the production storage system exists. For example, the current sensor may indicate that a component draws more current than stipulated under the reference dissipation model. Based on this difference, the method 700 may update the reference dissipation model. If no variation is detected, the method 700 may return to block 710 to implement the reference dissipation model. Otherwise, upon identifying, based on the received power dissipation feedback, a variation from an expected power and/or heat dissipation in relation the one or more components of the production storage system and the reference dissipation model, at block 725, the method 700 may include adjusting the reference dissipation model on the production storage system in relation to the identified variation. In some embodiments, the method 700 may return to block 710 and implement the adjusted reference dissipation model.

The operations at blocks 705, 710, 715, 720, 725 may be performed using the power management module 130 described with reference to FIGS. 1-4 and/or another module. Thus, the method 700 may provide for active power management relating to active power management. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising a storage controller to:
   obtain a default reference dissipation model that is generated based on power dissipation metrics for a plurality of components of a reference storage system operating under one or more operating scenarios, the plurality of components comprising at least one of a servo motor, a spindle, or a read/write head, or any combination thereof;
   implement, based on the default reference dissipation model, a local reference dissipation model in the storage system to make component scheduling decisions in relation to power management of the storage system;
   implement from the local reference dissipation model a first default maximum number of components within the plurality of components used to perform a first operation and implement a second default maximum number of components used to perform a second operation;
   identify one or more environmental conditions associated with operation of the storage system;
   identify an amount of heat generated by the first default maximum number of components when using the first default maximum number of components to perform the first operation in the identified one or more environmental conditions; and
   adjust the local reference dissipation model based at least in part on the identified amount of heat generated by the first default maximum number of components, wherein adjusting the local reference dissipation model includes replacing in the local reference dissipation model the first default maximum number of components with a first local maximum number of components that is more than or less than the first default maximum number of components or replacing in the local reference dissipation model the second default maximum number of components with a second local maximum number of components that is more than or less than the second default maximum number of components, or replacing both.

2. The storage system of claim 1, the plurality of components further comprising at least one of a flash memory die, a storage controller, a storage processor, or a storage buffer, or any combination thereof, the storage system comprising any combination of a hard disk drive, a solid state drive, a hybrid drive, and a system of multiple storage drives.

3. The storage system of claim 1, the storage controller to:
receive power dissipation feedback from a current sensor on the storage system in relation to a first component of the storage system, the first component being associated with at least one of the plurality of components.

4. The storage system of claim 3, the storage controller to:
identify, based on the received power dissipation feedback, a variation from an expected power dissipation of the first component of the storage system in relation to the reference dissipation model.

5. The storage system of claim 4, the storage controller to:
adjust the reference dissipation model on the storage system in relation to the identified variation of the first component.

6. The storage system of claim 1, the storage controller to:
receive a request to perform an operation on the storage system, the operation comprising at least one of a read operation, a write operation, and an erase operation.

7. The storage system of claim 6, the storage controller to:
identify a predetermined default number of components used to perform the requested operation.

8. The storage system of claim 7, the storage controller to:
determine, based on the reference dissipation model, a maximum number of components to use to perform the requested operation while keeping the storage system operating within guidelines of a power budget imposed on the storage system.

9. The storage system of claim 8, the storage controller to:
schedule the maximum number of components of the storage system to perform the requested operation, the maximum number of components exceeding the default number of components used for the operation.

10. The storage system of claim 8, determining the maximum number of components comprising a determination that an amount of heat generated by the maximum number of components performing the requested operation does not exceed a thermal budget imposed on the storage system.

11. An apparatus comprising:
a storage drive; and
a controller to:
obtain a default reference dissipation model that is generated based on power dissipation metrics for a plurality of components of a reference storage system operating under one or more operating scenarios, the plurality of components comprising at least one of a servo motor, a spindle, or a read/write head, or any combination thereof;
implement, based on the default reference dissipation model, a local reference dissipation model in the storage drive to make component scheduling decisions in relation to power management of the storage drive;
implement from the local reference dissipation model a first default maximum number of components within the plurality of components used to perform a first operation and implement a second default maximum number of components used to perform a second operation;
identify one or more environmental conditions associated with operation of the storage system;
identify an amount of heat generated by the first default maximum number of components when using the first default maximum number of components to perform the first operation in the identified one or more environmental conditions; and
adjust the local reference dissipation model based at least in part on the identified amount of heat generated by the first default maximum number of components, wherein adjusting the local reference dissipation model includes replacing in the local reference dissipation model the first default maximum number of components with a first local maximum number of components that is more than or less than the first default maximum number of components or replacing in the local reference dissipation model the second default maximum number of components with a second local maximum number of components that is more than or less than the second default maximum number of components, or replacing both.

12. The apparatus of claim 11, the plurality of components further comprising at least one of a flash memory die, a storage controller, a storage processor, or a storage buffer, or any combination thereof, the storage drive comprising any combination of a hard disk drive, a solid state drive, a hybrid drive, and a system of multiple storage drives.

13. The apparatus of claim 11, the controller to:
receive power dissipation feedback from a current sensor on the storage drive in relation to a first component of the storage drive, the first component being associated with at least one of the plurality of components.

14. The apparatus of claim 13, the controller to:
identify, based on the received power dissipation feedback, a variation from an expected power dissipation of the first component of the storage drive in relation to the reference dissipation model.

15. The apparatus of claim 14, the controller to:
adjust the reference dissipation model on the storage drive in relation to the identified variation of the first component.

16. The apparatus of claim 11, the controller to:
receive a request to perform an operation on the storage drive, the operation comprising at least one of a read operation, a write operation, and an erase operation.

17. The apparatus of claim 16, the controller to:
identify a predetermined default number of components used to perform the requested operation.

18. The apparatus of claim 17, the controller to:
determine, based on the reference dissipation model, a maximum number of components to use to perform the requested operation while keeping the storage drive operating within guidelines of a power budget imposed on the storage drive.

19. A method comprising:
obtaining a default reference dissipation model that is generated based on power dissipation metrics for a plurality of components of a reference storage system operating under one or more operating scenarios, the plurality of components comprising at least one of a servo motor, a spindle, or a read/write head, or any combination thereof;
implementing, based on the default reference dissipation model, a local reference dissipation model in the storage system to make component scheduling decisions in relation to power management of the storage system, the storage system comprising any combination of a hard disk drive, a solid state drive, a hybrid drive, and a system of multiple storage drives;
identifying from the reference dissipation model a first default number of components used to perform a first operation and identify a second default number of components used to perform a second operation;

identifying one or more environmental conditions associated with operation of the storage system;

identifying an amount of heat generated by the first default maximum number of components when using the first default maximum number of components to perform the first operation in the identified one or more environmental conditions; and adjusting the local reference dissipation model based at least in part on the identified amount of heat generated by the first default maximum number of components, wherein adjusting the local reference dissipation model includes replacing in the local reference dissipation model the first default maximum number of components with a first local maximum number of components that is more than or less than the first default maximum number of components or replacing in the local reference dissipation model the second default maximum number of components with a second local maximum number of components that is more than or less than the second default maximum number of components, or replacing both.

20. The method of claim 19, the plurality of components further comprising at least one of a flash memory die, a storage controller, a storage processor, or a storage buffer, or any combination thereof.

* * * * *